Feb. 27, 1934.    W. A. SHARP    1,949,337
JUNCTION BOX
Filed April 6, 1932    2 Sheets-Sheet 1

Inventor
William A. Sharp

By Clarence A. O'Brien
Attorney

Feb. 27, 1934.  W. A. SHARP  1,949,337
JUNCTION BOX
Filed April 6, 1932  2 Sheets-Sheet 2

Inventor
William A. Sharp
By Clarence A. O'Brien
Attorney

Patented Feb. 27, 1934

1,949,337

UNITED STATES PATENT OFFICE 1,949,337

JUNCTION BOX

William A. Sharp, San Luis Obispo, Calif.

Application April 6, 1932. Serial No. 603,636

1 Claim. (Cl. 247—22)

This invention relates to certain appreciable structural refinements and supplementary improvements incorporated in a novel junction box of the type used in building and construction work to accommodate electrical current conductors and lighting fixtures.

It is a matter of common knowledge to those skilled in the art to which the invention relates that the usual ceiling structure embodies spaced parallel joists to which spaced laths, (wooden or metallic) are fastened to support the plaster in the usual manner. Secondly, in order to facilitate attachment of junction boxes, the conventional plan is to utilize hanger bar (generally metal straps or the like) which are secured to the joists in longitudinally spaced relation, the junction boxes being suitably fastened to said bar. It is obvious however that in order to accommodate the junction box it is necessary to cut off the ends of the laths within the immediate vicinity of the box and unless these free ends of the laths are supported effectively plastering defects frequently result.

The idea of supporting the lath ends near the junction box is not broadly new, in fact I am aware that junction boxes have been provided with so called plaster ring to accomplish this result. The purpose of the present invention however is to provide an improved plaster ring and a supplemental clamping ring for firmly clamping the lath-end to the junction box to provide a more substantial and practical arrangement.

The purpose of the invention is to provide a structure which will accomplish this result in a satisfactory, feasible and practical manner while at the same time maintaining the requisite advantages of simplicity and economy, this being accomplished by an arrangement which is believed to be a decided improvement on prior known junction box laths supporting means.

In the drawings:

Figure 5 is a perspective view of a spacing sleeve.

Figure 2:
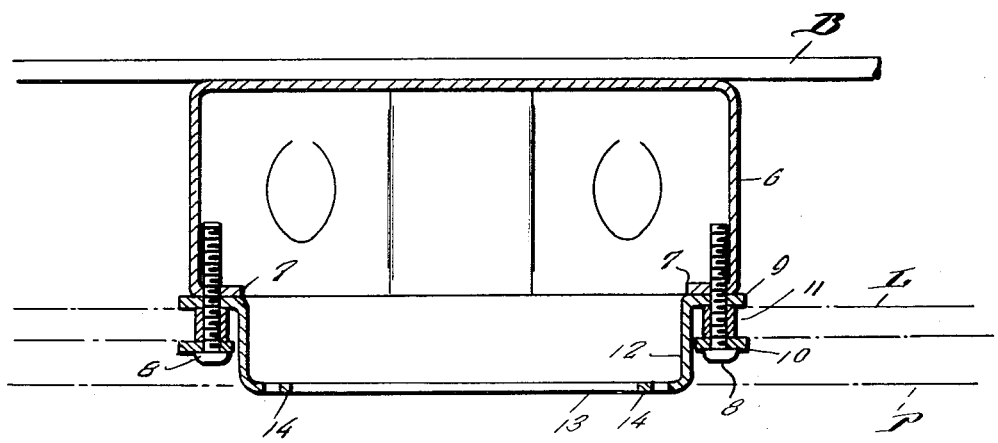
Figure 2 is a sectional view disclosing the relative relationship of parts more plainly.
Figure 3:
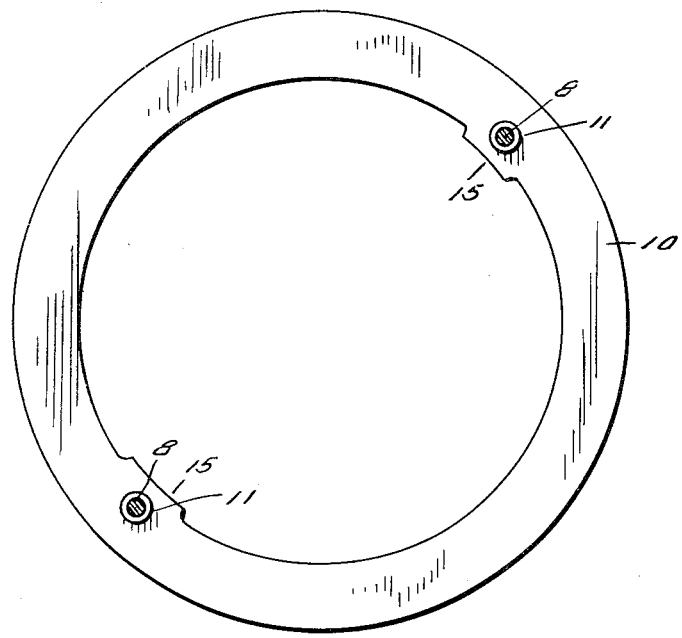

In Figure 2 the letter B designates one of the customary hanger bars for the conventional junction box 6. This bar is usually supported between two joists (not shown). The laths are denoted by the letters L and the plaster by the letter P. The junction box is conventional and provided with diametrically opposite inturned attaching ears 7 screw threaded to accommodate the retaining bolt 8 for the plaster ring and lath support ensemble. The latter device is of a duplex nature that is comprises a main ring 9 and a supplemental ring 10, the ring 10 being supported beneath the ring 9 by the bolt 8 which pass through the apertures in both rings and are threaded into the screw threaded holes of the ears 7 as seen in Figure 2. Incidentally the numerals 11 designate spacing sleeves which surround the bolts space the rings apart to provide a substantially endless clamping sleeve between the two rings for supporting the terminal ends of a lath L. The rings 9 is provided with a depending annulus 12 having an inturned marginal lip 13 provided with diametrically opposite apertured lugs 14 to accommodate the attaching means for the lighting fixture (not shown).

Figure 1:
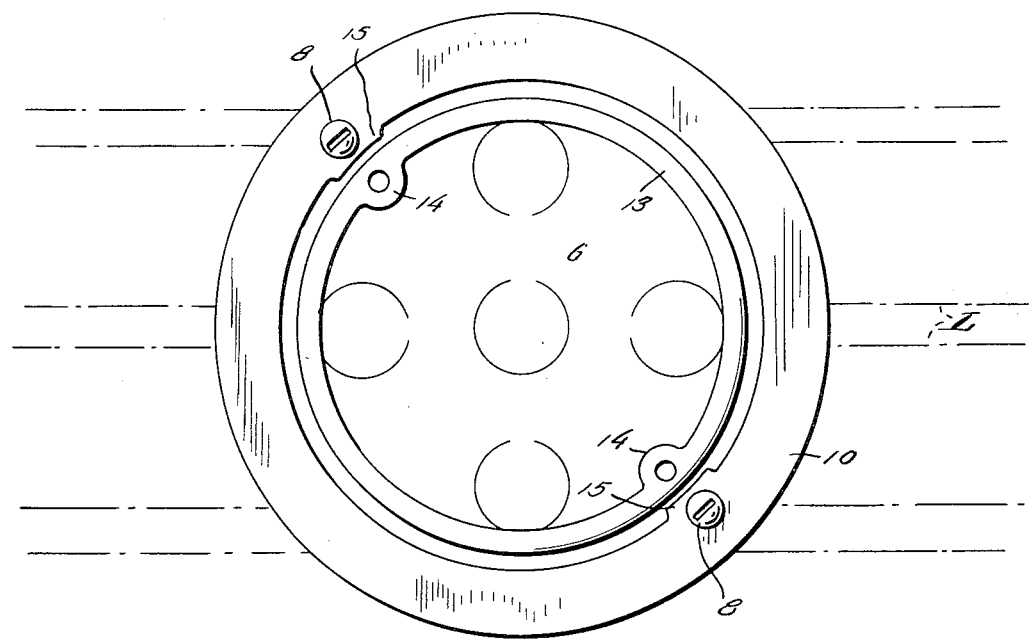
Figure 1 is a bottom plan view of a structure developed in accordance with the present invention.
Figure 4:
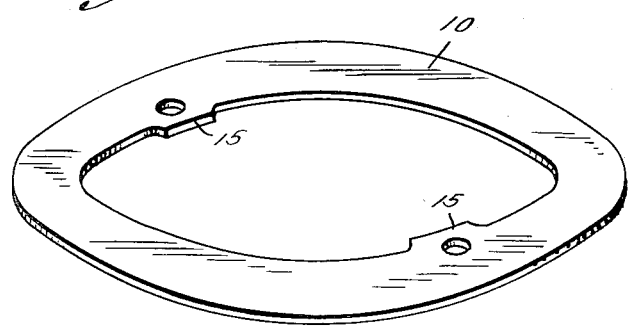
Figure 4 is a perspective view of the supplemental lath clamping and supporting ring.
Figure 3:
Figure 3 is a horizontal sectional view.

The gist of the invention is to provide the main and supplemental rings 9 and 10 attachable by the bolt 8 to the ears 7 of the junction box 6, said rings being so arranged as to provide a novel duplex ring clamp for the terminal ends of the lath for securely and rigidly supporting said lath ends in order to provide a more satisfactory plastering job. As before stated it is not new to provide a single plastering but the double ring arrangement herein shown wherein the main ring carries the depending annulus or skirt for uniform suspension of lighting fixtures is novel. Another point of novelty is the provision of the projections or extensions located at diametrically opposite points and indicated by the numeral 15 in Figure 3, these being carried by the inner edge of the ring 10 to serve as indicators to facilitate alining of the bolt holes to expedite assembly. As a matter of fact it will be noted that these extensions 15 are in alinement with the ears 7 as well as the lugs 14 facilitating satisfactory assembly.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:

In a structural arrangement of the class described, in combination, a junction box having diametrically opposite suspension ears, said ears being formed with screw threaded holes, a main lath ring, a supplemental lath ring, said rings having bolt holes adapted to be brought into registry with the screw threaded holes in said ears, bolts passing through all of said holes, spacing sleeves surrounding the intermediate portions of the bolts to hold the rings in vertically spaced relationship to receive the lath-end, said main ring being provided with a depending annulus extending below the supplemental ring and having an inturned lip provided with apertured fixtures suspension lugs.

WILLIAM A. SHARP.